Jan. 8, 1946.    W. M. NEFF    2,392,400
BOMB RACK
Filed Oct. 17, 1941    2 Sheets-Sheet 1
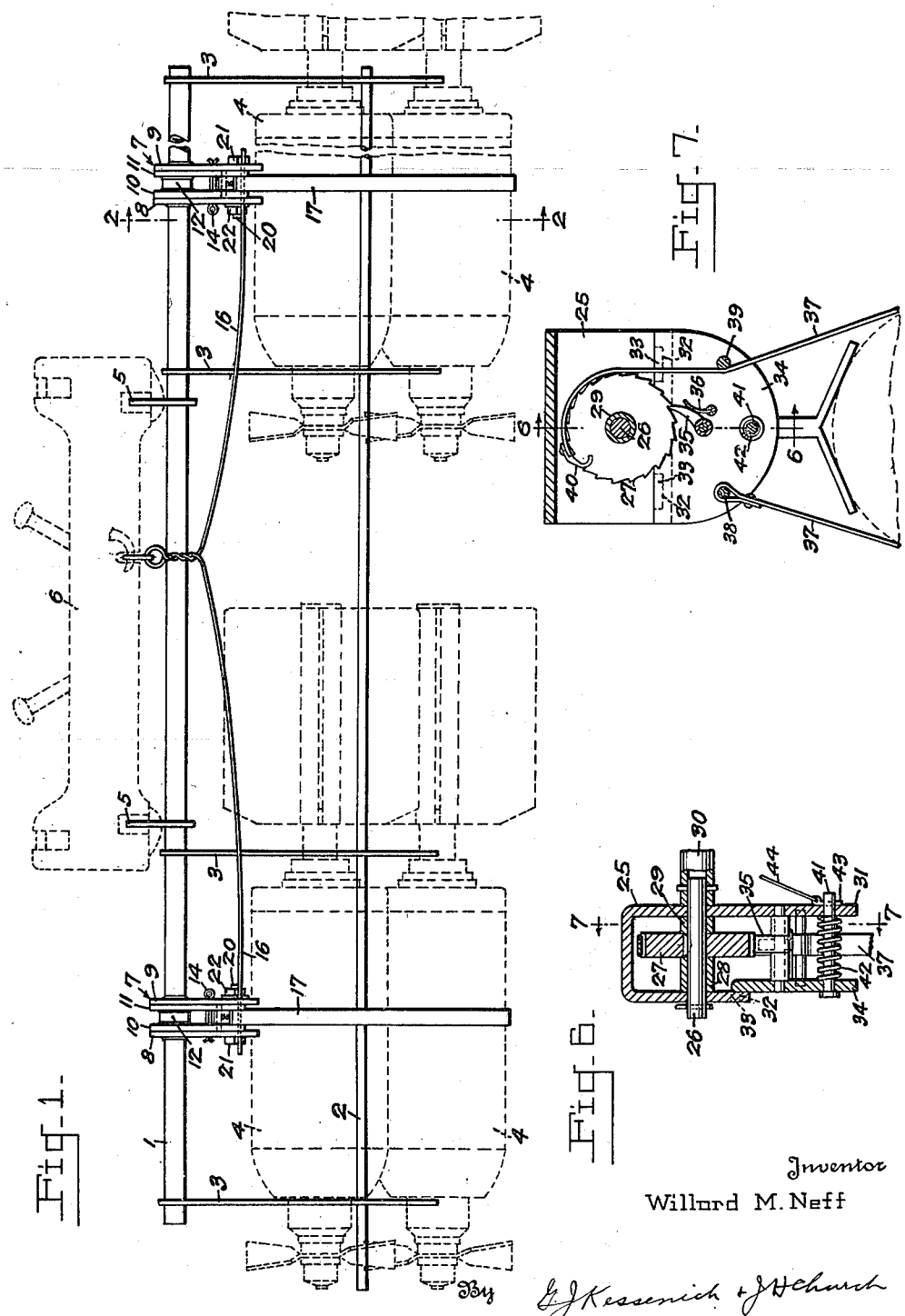
Inventor
Willard M. Neff

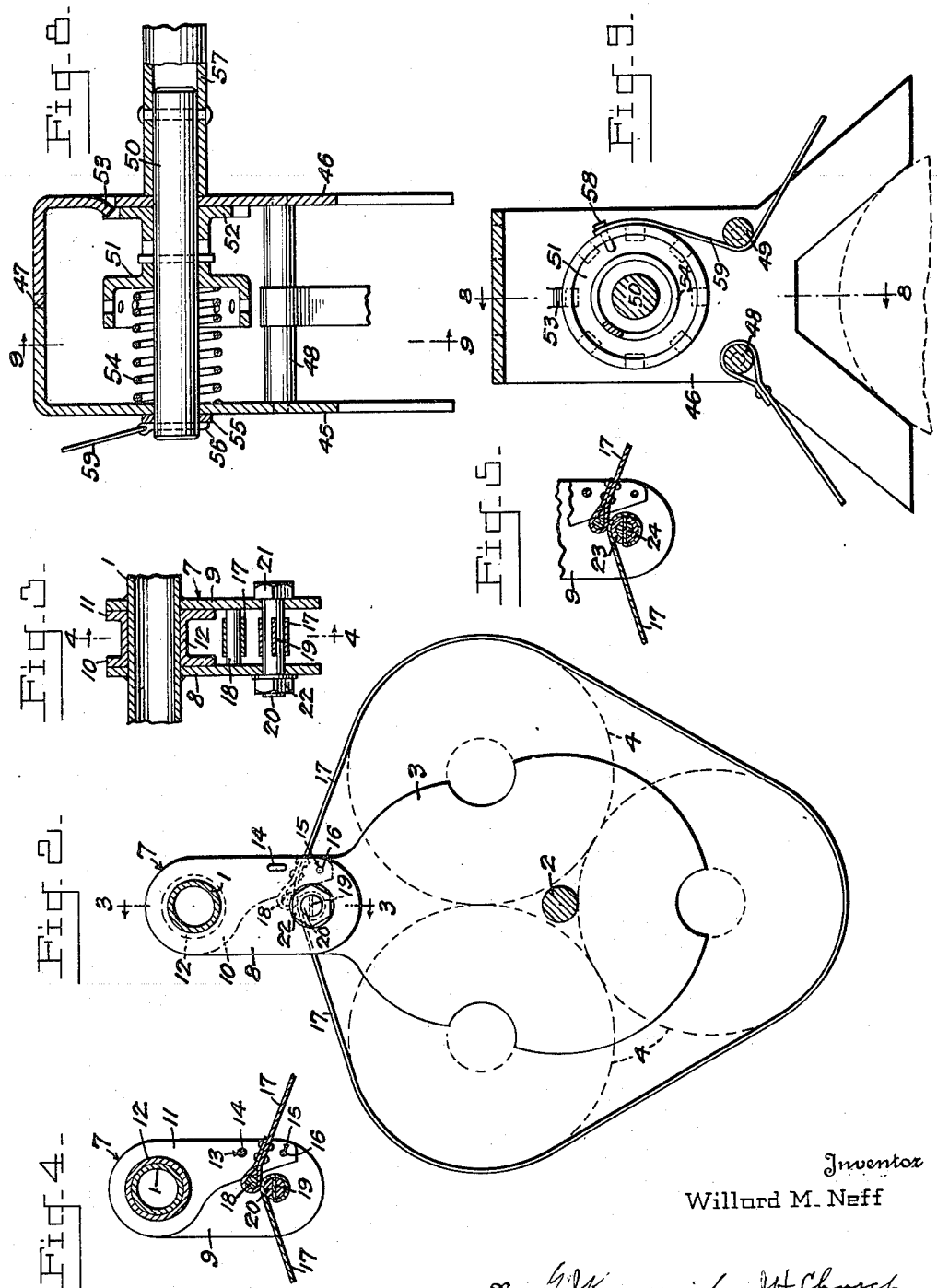

Patented Jan. 8, 1946

2,392,400

UNITED STATES PATENT OFFICE 2,392,400

BOMB RACK

Willard M. Neff, Dayton, Ohio

Application October 17, 1941, Serial No. 415,435

7 Claims. (Cl. 89—1.5)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a bomb rack and more particularly to means for releasing a plurality of individual bombs from an expendable unitary rack designed to be accommodated without alteration in the demolition bomb shackles of standard aircraft.

It is therefore an object of this invention to produce a releasing gear for a plurality of individual bombs which permits them to be dropped either in armed or safe condition from the shackles designed to accommodate larger bombs and to accomplish such release without change in the present bomb releasing gear of the aircraft.

It is a further object to produce a multiple bomb rack which will release the individual bombs readily and dependably in armed condition to allow each bomb to function as a unit.

It is a further object to provide a multiple bomb rack which when dropped in safe condition will maintain the rack and bombs together as a unit until the ground is struck.

The specific nature of the invention as well as other objects and advantages thereof will clearly appear from a description of a preferred embodiment as shown in the accompanying drawings in which:

Figure 1 is a side elevation of a bomb rack formed in accordance with my invention, the bomb shackle and the individual bombs being shown in dotted lines.

Figure 2 is a cross section on the line 2—2 of Figure 1.

Figure 3 is a longitudinal section on the line 3—3 of Figure 2.

Figure 4 is a cross section on the line 4—4 of Fig. 3.

Figure 5 is a partial cross section on the line 4—4 of Figure 3 showing a modified form of band securing means.

Figure 6 is a longitudinal section of a modified form of release taken on the line 6—6 of Fig. 7.

Figure 7 is a cross section on the line 7—7 of Fig. 6.

Figure 8 is a longitudinal section of another form of release taken on the line 8—8 of Fig. 9.

Figure 9 is a cross section on the line 9—9 of Fig. 8.

Referring to the drawings by characters of reference Figure 1 shows a bomb rack comprising a suspension bar 1, a center supporting bar 2 and spacer plates 3 adapted to properly space a plurality of individual bombs 4, shown in dotted lines. The suspension bar 1 is provided with lugs 5 for attaching the multiple rack to a known type of bomb shackle 6. The present invention relates particularly to the releasing mechanism for the individual bombs. The preferred embodiment of this mechanism is referred to generally as 7 in Fig. 1 and is shown in more detail in Figures 2 to 4.

Each releasing device 7 comprises a pair of spaced plates 8 and 9 welded or otherwise secured to the suspension bar 1. Rotatably mounted on the suspension bar 1 between the plates 8 and 9 is a latch member comprising a pair of spaced parallel bars 10 and 11 secured to each other by means of a bushing 12 rotatable on the suspension bar 1. Aligned openings 13 are provided at least through the plate 9 and bar 11 and preferably also through plate 8 and bar 10 in which a cotter pin 14 may be secured to prevent relative movement therebetween during storage and handling. A similar opening 15 may be provided through the plates and bars to receive an arming wire 16 which may be inserted through one or both plates and their cooperating latch bars prior to removal of the cotter pin 14. As shown in Figures 2 and 4 one end of the bomb retaining band 17 is provided with a loop engaging a pin 18 or similar member slidable between the plates 8 and 9 and received therebetween behind the latch bars 10 and 11. The retaining band 17 is passed around the bombs in the rack and threaded into a slot 19 in the shank of a bolt 20. A wrench may be applied to the head 21 of the bolt 20 and the bolt rotated to tighten the band sufficiently to hold the bombs firmly in place in engagement with the spacer plates. The nut 22 may then be tightened to prevent reverse rotation of the bolt and hence secure the band under the proper degree of tension. In some cases it may be desirable to use a slotted bushing 23 on the shank of the bolt 24 between the plates 8 and 9 and thread the band 17 through the slot in the bushing into the slot in the bolt as shown in Fig. 5. In this way the bushing 23, being engaged between the plates 8 and 9, will permit the bolt 24 to be secured much more tightly without deforming the plates 8 and 9 to an extent sufficient to interfere with the free movement of the latch plates 10 and 11 or pin 18.

As many of the released mechanism units 7 as may be required to secure the desired number of groups of bombs may be mounted on the suspension bar 1. As shown in Fig. 1, one band and associated release mechanism has been applied to the suspension bar for each group of bombs.

When it is desired to drop the bombs in armed condition the controls of the bomb shackle 6 are operated in a known manner to simultaneously release the lugs 5 on the suspension bar from the shackle while retaining the arming wire in engagement with the shackle. As the cluster of bombs falls away from the shackle the arming wire 16 will be withdrawn from the openings 15. The cotter pin 14 will, of course, have been removed subsequent to the insertion of the arming wire and prior to release of the rack. The tension in the band and weight of the individual bombs 4 will cause the latch members 10 and 11 to swing outwardly permitting withdrawal of the pin 18 by the band and release of the individual bombs. As the individual bombs 4 fall away from the supporting bar 2 the arming vanes of each bomb will be left free to rotate, thus arming the individual bombs in flight. The rack will fall free and be lost but as it is of simple construction its loss will be of less consequence than would be the loss of time required to modify the demolition racks in the plane proper to permit direct handling of the small bombs.

When it is desired to drop the bombs in safe condition, as when making a forced landing over friendly territory, the controls of the bomb shackle may be operated in the known manner to simultaneously release the lugs 5 and the arming wires 16 from the bomb shackle 6. The assembly will thus drop as a unit with all bombs retained in safe condition.

In the modified form of my invention shown in Figures 6 and 7 the release mechanism, which may be secured to a suspension bar in any convenient manner, comprises a U-shaped member 25 having suitable bearing openings therein for rotatably receiving a shaft 26 to which there is integrally attached a ratchet wheel 27. Bushings 28 and 29 space the ratchet wheel between the arms of the U-shaped member. A member 30 may be pin connected to shaft 26 to allow the transmission of a driving force to the ratchet. One arm of the U-shaped member 25 is extended as at 31 (Fig. 6) and the other arm of the member 25 is formed with recesses 32 adapted to receive projecting parts 33 on a member 34. A pawl 35 spaced to cooperate with the ratchet 27 is pivotally mounted between the extension 31 and member 34 and held in engagement with the ratchet by means of a spring 36. One end of the bomb retaining band 37 is secured in any convenient manner to a pin 38 received in suitable recesses in the members 31 and 34. The other end of the band 37 may be led under a pin 39 and is provided with a hook 40 receivable in a recess in the ratchet 27. The member 34 is retained in operative relation to the U-shaped member by means of a bolt 41 inserted through the members 31 and 34 and confining a spring 42 therebetween. A pin 43 inserted through the extremity of bolt 41 and connected to an arming wire 44 serves to releasably secure the bolt in place.

When the bomb rack is released the pin 43 will be withdrawn by the arming wire 44 allowing the spring 42 to impel the member 34 out of engagement with the pawl and pins 38 and 39 permitting the ratchet to rotate, releasing the hook 40 and releasing also the other end of the band whereby the bombs will be permitted to fall free of the rack.

In the form of my invention shown in Figures 8 and 9 plate members 45 and 46, of L-shaped cross section, one of which may be secured to a suspension bar, are provided with separable interengaging means as at 47. Pins 48 and 49, provided with end portions of reduced diameter, are engaged in openings in the lower portions of the plate members and assist in spacing the plates as well as performing other functions hereinafter described. A shaft 50 is rotatably mounted in the upper portion of the plate members and constrained to rotate therewith but permitted to move longitudinally thereon is a pulley-like member 51. A rim 52 on the member 51 is toothed to cooperate with a projecting finger 53 formed in the wall of the plate 46 and a spring 54 is engaged between the pulley member and the plate 45. A washer 55 and pin 56 secure the plates together. A member 57 secured to the shaft 50 prevents the plate 46 from being forced off the shaft and furnishes a means to rotate the shaft. A bomb retaining band 59 may be secured on the pin 48, passed around the bombs, returned beneath the pin 49 and secured to the periphery of the pulley 51 by a pin 58 or other convenient means. The band may be properly tensioned by rotation of the shaft 50, the pulley member being moved out of engagement with the finger 53 to permit such rotation. The faces of the teeth on the rim 52 and the finger 53 may be so ground as to cam the pulley out of engagement on rotation in a direction to tension the band, while allowing square faces to engage to resist rotation in the opposite direction.

Upon dropping of the assembled bomb rack an arming wire 59 will withdraw the pin 56 permitting the spring 54 to force the plates apart thus releasing the pins 48 and 49 and the pulley member 51 to release both ends of the band 59 and permit the individual bombs to fall free of the rack.

I claim:

1. Means to secure bombs to a suspension bar comprising a pair of plates adapted to be fixedly secured to said suspension bar in spaced parallel relation to each other, a pair of spaced parallel latch bars swingable between said plates, a bolt through said plates, a flexible band secured at one end to said bolt, a member slidable between said plates but engageable by said latch bars, aligned holes in said latch bars and said plates, and an arming wire inserted through said holes to prevent swinging of said latch bars relative to said plates, said flexible band being adapted to encircle the bombs to be secured and passing between said latch bars into secured relation with said slidable member whereby the band may be released on withdrawal of the arming wire.

2. The bomb securing means described in claim 1, said bolt having a longitudinal slot in the shank thereof, the bolt secured end of said band being inserted through said slot whereby the band may be tensioned by rotation of the bolt.

3. The bomb securing means described in claim 1, a bushing on said bolt between said fixed plates, longitudinal slots in said bushing and said bolt, the bolt secured end of said band being threaded through said slots whereby the band may be tensioned by rotation of the bolt and secured by tightening the bolt upon the fixed plates to prevent reverse rotation of said bolt.

4. Releasable means to secure bombs to a suspension member, said means comprising a clevis-like member secured to said suspension member, one arm of said clevis being of greater length than the other, a shaft journaled in the arms of said clevis, a ratchet wheel secured on said shaft between the arms of said clevis, recesses formed near the end of the shorter arm of said clevis, an extension arm for the shorter arm of said clevis, said extension arm having projections engaging said recesses, a pawl for said ratchet rotatably supported between said extension and the longer arm of said clevis, a spring constraining said pawl to ratchet engaging position, a flexible band adapted to encircle bombs, means supported between said extension and said longer arm engaging an end of said band, means on the other end of said band engaging said ratchet wheel, a spring between said extension and said longer arm tending to separate the same, a bolt through said extension and said longer arm opposing separation thereof, an arming wire, and means on said bolt releasable by withdrawal of said arming wire permitting separation of said last mentioned arm and extension whereby said ratchet pawl and said band will be released.

5. Releasable means to secure bombs comprising a clevis-like member, a ratchet wheel journaled in said member, a pawl supported by said member and engaging said ratchet, a flexible band adapted to encircle the bombs to be secured, one end of said band being supported by said member and the other end of said band having hook means engaging a recess in the rim of said ratchet wheel, an arming wire, and means actuated by withdrawal of said arming wire to release said pawl and at least one end of said band.

6. Releasable means to secure bombs, said releasable means comprising a separable clevis-like member, a toothed wheel journaled in said member, means supported by the separable parts of said member engageable with the teeth of said wheel to selectively prevent rotation thereof, spring means tending to produce separation of the parts of said member, a flexible band adapted to encircle the bombs to be secured, means supported by the separable parts of said member prior to separation thereof engaging one end of said band, means on the other end of said band engaging the rim of said wheel to be tensioned by rotation thereof, an arming wire, and means released by withdrawal of said arming wire opposing separation of the parts of said member whereby said member will be permitted to separate and release said band on withdrawal of said arming wire.

7. Releasable means to secure bombs, said releasable means comprising a separable clevis-like member, a shaft journaled in said member, a wheel rotatable with said shaft and movable longitudinally thereon, a projection on an inner face of said clevis-like member, a toothed portion on said wheel engageable with said projection, a spring on said shaft constraining said wheel to projection engaging position and tending to separate said clevis-like member, an arming wire, means released by withdrawal of said arming wire opposing separation of the parts of said member, a pin engaged between the separable parts of said member and released by separation thereof, and a bomb engaging band secured at one end to said pin and at the other end to the periphery of said wheel.

WILLARD M. NEFF.